W. P. POWERS.
Belting.
No. 142,272.  Patented August 26, 1873.
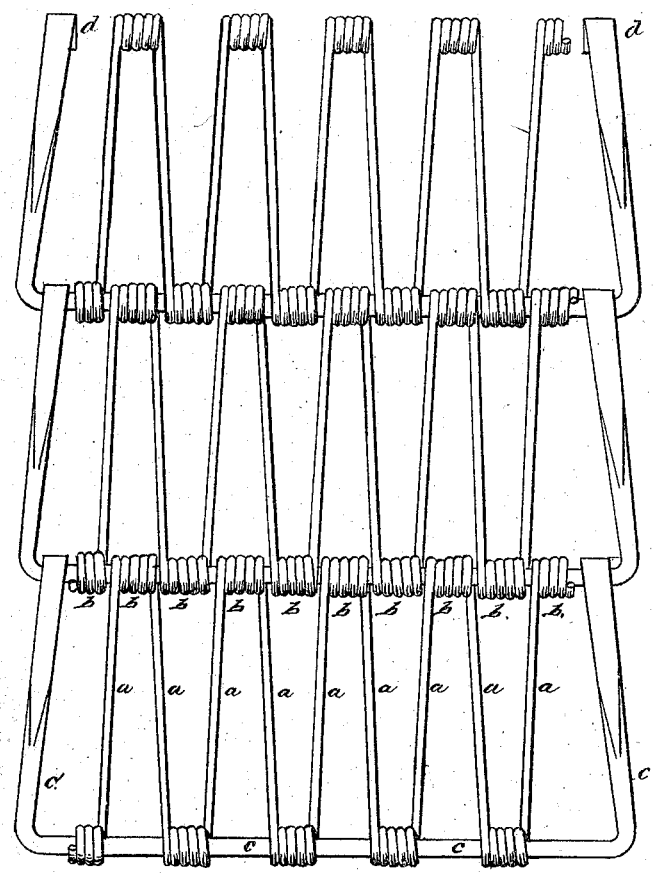
Witnesses.
R. P. Plumb
J. B. Richards
Inventor.
William P. Powers.

UNITED STATES PATENT OFFICE.

WILLIAM P. POWERS, OF NORTH LA CROSSE, WISCONSIN.

IMPROVEMENT IN BELTING.

Specification forming part of Letters Patent No. 142,272, dated August 26, 1873; application filed August 3, 1872.

*To all whom it may concern:*

Be it known that I, WILLIAM P. POWERS, of North La Crosse, in the county of La Crosse, State of Wisconsin, have invented a certain new and useful Improvement in Metal Belting; and I do hereby declare that the following is a full, clear, and exact description thereof, reference being made to the accompanying drawings and to the letters of reference marked thereon.

The nature of my invention consists in the employment of a series of wire links, connected together in the manner and for the purpose hereinafter described.

To enable others skilled in the art to which my invention appertains to make and use the same, I will now describe its construction and operation.

$a$ represents a series of wires, forming the inside strands of the belt. Those in each link are formed of one piece of wire, wound continuously forward and back from the base of one link to the base of the next, making a certain number of coils, $b$, around each base-wire, commencing at one side of the belt and ending at the other; or it may be made of two or more pieces of wire, in the manner described. These wires may be wound in the same direction upon each base-wire, or in the opposite direction upon each, as shown in the accompanying drawing. $c$ is also a series of wires, bent so as to form, at their bases, the side of a rectangle, provided at each end with an eye, $d$, formed by turning the ends over the base of the next link. These wires are larger than the inside wires $a$ $a$, and are flattened at their ends in order to bring the eye $d$ to the same size as the coil formed by the inside wire $a$.

My belting is thus formed: I first form the inside link $a$ $a$ with the coils $b$ $b$, as many as are required for the width of the belt. I then place two of these links together, the coils at one end of each fitting together. The base-wire $c$ is then passed through these coils and bent into rectangular shape at the sides. The ends are then flattened, and the eyes $d$ $d$ formed upon them. I then insert another inside link, $a$ $a$, as before, and pass another base-wire, $c$, through the eyes $d$ $d$ and the coils $b$ $b$, which is bent up at the sides and provided with eyes $d$ $d$, as before; and so on until the required length of belting has been made, each link or part of a link to consist of three or more coils formed of one piece of wire.

This belting can be made of any width.

I am aware that belting has been made before with the inside strands formed of separate pieces of wire, and with the base-wires bent at the sides and coiled about the base of the next link.

What I claim as new, and desire to secure by Letters Patent, is—

1. The construction of the link $a$ $a$, formed by coiling a continuous piece of wire alternately around each of the two bases into three or more coils, substantially in the manner and for the purpose described.

2. The base-wires $c$ $c$, flattened and made with an eye, as described, in combination with the inside wires $a$ $a$, substantially in the manner and for the purpose described.

In testimony that I claim the foregoing as my own I affix my signature in presence of two witnesses.

WILLIAM P. POWERS.

Witnesses:
J. B. RICHARDS,
R. P. PLUMB.